(12) United States Patent
Stephenson et al.

(10) Patent No.: US 7,341,236 B2
(45) Date of Patent: Mar. 11, 2008

(54) PILOT OPERATED VALVE WITH A PRESSURE BALANCED POPPET

(75) Inventors: Dwight B. Stephenson, Oconomowoc, WI (US); Xiaolong Yang, Germantown, WI (US); Randall J. Jackson, Burlington, WI (US); R. Christopher Hughes, Wind Lake, WI (US)

(73) Assignee: HUSCO International, Inc., Waukesha, WI (US)

( * ) Notice: Subject to any disclaimer, the term of this patent is extended or adjusted under 35 U.S.C. 154(b) by 122 days.

(21) Appl. No.: 11/370,003

(22) Filed: Mar. 7, 2006

(65) Prior Publication Data

US 2007/0210270 A1    Sep. 13, 2007

(51) Int. Cl.
*F16K 31/12* (2006.01)

(52) U.S. Cl. .............. 251/30.04; 251/30.03; 251/38

(58) Field of Classification Search ......... 251/30.01, 251/30.02, 30.03, 30.04, 30.05, 38
See application file for complete search history.

(56) References Cited

U.S. PATENT DOCUMENTS

| | | | |
|---|---|---|---|
| 2,575,272 A * | 11/1951 | Harris | 251/30.04 |
| 4,174,824 A * | 11/1979 | Kolze | 251/30.03 |
| 4,699,351 A * | 10/1987 | Wells | 251/29 |
| 5,878,647 A | 3/1999 | Wilke et al. | |
| 6,149,124 A | 11/2000 | Yang | |
| 6,328,275 B1 | 12/2001 | Yang et al. | |
| 6,736,370 B1 * | 5/2004 | Crockett et al. | 251/331 |
| 6,742,763 B2 * | 6/2004 | Kremer | 251/112 |
| 6,745,992 B2 | 6/2004 | Yang et al. | |

* cited by examiner

*Primary Examiner*—John K. Fristoe, Jr.
(74) *Attorney, Agent, or Firm*—Quarles & Brady; George E. Haas

(57) ABSTRACT

A pilot operated valve has a main poppet that selectively controls flow of fluid between first and second ports in response to pressure in a control chamber on one side of the main poppet. The main poppet has an aperture extending between the control chamber and the first port. A pilot piston slides within the aperture and has the pilot passage with a pilot orifice and a first disk spring biases the pilot piston with respect to the main poppet. A pilot valve element selectively engages the pilot orifice to open and close the pilot passage and thereby controls motion of the main poppet. Forces from the first disk spring and a pressure differential between control and pilot chambers alter a position of the pilot valve seat with respect to the main poppet. The change in position compensates for effects on valve operation due to variation of the pressure at the two ports.

20 Claims, 1 Drawing Sheet

PILOT OPERATED VALVE WITH A PRESSURE BALANCED POPPET

BACKGROUND OF THE INVENTION

1. Field of the Invention

The present invention relates to pilot operated hydraulic valves, and more particularly to such valves that incorporate mechanisms which compensate for variation of a pressure differential across a pilot orifice.

2. Description of the Related Art

A wide variety of machines have moveable components which are operated by an hydraulic actuator, such as a cylinder and piston arrangement, that is controlled by a hydraulic valve. Traditionally, the hydraulic valve was manually operated by the machine operator. There is a present trend away from manually operated hydraulic valves toward electrical controls and the use of solenoid valves. This type of control simplifies the hydraulic plumbing as the control valves do not have to be located near an operator station, but can be positioned adjacent the actuator being controlled. This change in technology also facilitates computerized control of the machine functions.

Application of pressurized hydraulic fluid from a pump to the actuator can be controlled by a set of proportional solenoid valves such as described in U.S. Pat. No. 5,878, 647. Solenoid operated pilot valves are well known for controlling the flow of hydraulic fluid and employ an electromagnetic coil which moves an armature in one direction to open a valve. The armature acts on a pilot valve element that controls the flow of fluid through a pilot passage in a main valve poppet. Opening the pilot passage releases pressure in a control chamber thereby allowing the main valve poppet to move away from a valve seat which motion creates a path between the inlet and outlet of the valve. The amount that the valve opens is directly related to the magnitude of electric current applied to the electromagnetic coil, thereby enabling proportional control of the hydraulic fluid flow. Either the armature or another valve component is spring biased to close the valve when electric current is removed from the solenoid coil.

When an operator desires to move a component of the machine, an input device is operated to produce electrical signals that are applied to the set of solenoid valves for the respective hydraulic actuator, for example a cylinder-piston combination associated with that machine component. One solenoid valve is opened to supply pressurized fluid to a cylinder chamber one side of the piston and another solenoid valve opens to allow fluid being forced from an opposite cylinder chamber to drain to a reservoir, or tank. By varying the degree to which the solenoid valves are opened, the rate of flow into the associated cylinder chamber can be varied, thereby moving the piston at proportionally different speeds.

A drawback regarding conventional solenoid operated pilot valves results from effects produced by a pressure differential that develops across the valve. That pressure differential changes with variation of a load force exerted on the machine component that is operated by the hydraulic fluid from the valve. Variation of the load force and pressure of the fluid supplied to the valve affect the pressure differential across the valve. In the closed state, the pressure differential can affect the amount of force required to open the valve and to produce the desired fluid flow rate there through. As a result, variation of the pressure differential affects the magnitude of electrical current needed to operate the valve in the manner requested by the operator.

Therefore, it is desirable that the design of a solenoid operated valve mitigate the effects produced by different pressure differentials across the valve.

SUMMARY OF THE INVENTION

A pilot operated hydraulic valve has a body with a first port, a second port, and a valve seat between those ports. A main poppet selectively engages the valve seat to control flow of fluid from one port to the other port. A control chamber is defined in the body on a side of the main poppet remote that is from the valve seat. An aperture in the main poppet provides a fluid path between the first port and the control chamber.

A mechanism is provided to compensate the operation of main poppet for effects due to variation of the pressures at the first and second ports. That mechanism includes a pilot piston which is moveably received in the aperture of the main poppet and has a pilot passage there through. A disk spring biases the pilot piston with respect to the main poppet. A pilot valve element is operated to open and close the pilot passage which in turn controls movement of the main poppet with respect to the valve seat. Preferably, the pilot valve element engages a pilot seat at the opening of the pilot passage into the control chamber.

Change in the pressure differential between control and pilot chambers alters the position of the pilot valve seat with respect to the main poppet. The change in position counteracts the effects on valve operation due to variation of the pressure at the two ports.

DETAILED DESCRIPTION OF THE INVENTION

Figure 1:
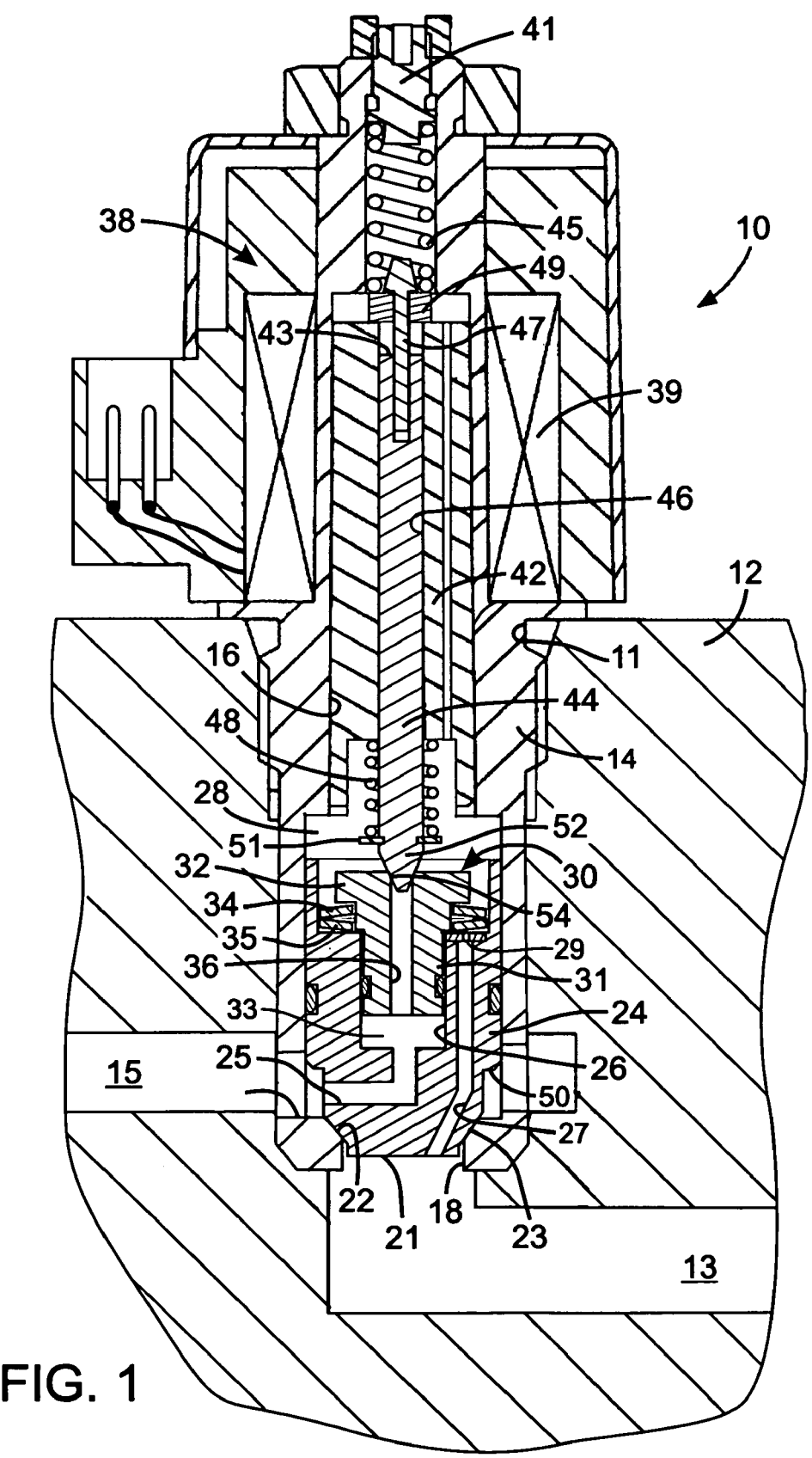
FIG. 1 is a cross sectional view through a solenoid operated hydraulic valve according to the present invention.

With reference to FIG. 1, a solenoid operated hydraulic valve 10 comprises a cylindrical valve body 14 that is mounted in an aperture 11 of a valve block 12. A first conduit 13 and a second conduit 15 in the valve block 12 open into the aperture 11. The valve body 14 has a longitudinal first bore 16 with a first, or inlet port at one end and in communication with the first conduit 13. A second, or outlet, port 20 is formed in the side of the valve body 14 and is communicates with the second conduit 15. A valve seat 22 is formed in the first bore 16 between the first and second ports 18 and 20. Although the present invention is being described in the context of a unidirectional valve, that controls the flow of fluid from the first port to the second port, the novel concepts can be incorporated into bidirectional valves.

A main poppet 24 slides within the valve body first bore 16 and engages and disengages the valve seat 22 to selectively control flow of hydraulic fluid between the first and second ports 18 and 20. For that purpose, the nose 21 of the main poppet 24 has a frustoconical surface 23 that in the closed state of the valve abuts the valve seat 22. An aperture 26 is centrally located in the main poppet 24 and extends inward from a control chamber 28 on the remote side of the main poppet from the valve seat 22. A first control passage 25 links the inner end of the aperture 26 to the second port 20. A second control passage 27, with a control orifice 29 therein, provides a fluid path through the main poppet 24 between the first port 18 and the control chamber 28.

The hydraulic valve 10 includes a pressure compensating mechanism 30 that counteracts for effects due to variation of the pressure differential across the valve. The pressure compensating mechanism 30 comprises a pilot piston 31 slideably received in the aperture 26 of the main poppet 24 thereby defining a pilot chamber 33 into which the first control passage 25 opens. A pilot passage 36 extends through the pilot piston 31 between the control chamber and the interior portion of the main poppet aperture 26. The pilot piston 31 has an enlarged head 32 at the end facing the control chamber 28 and a pair of conically shaped disk springs 34 and 35, commonly known as Belleville washers, is located around the pilot piston biasing the head 32 away from the main poppet 24. The two disk springs 34 and 35 are stacked face to face, which orientation lowers the spring rate as compared to a single disk spring. However, a single disk spring or a stack with more that two disk springs may be used. Opposite sides of the pilot piston 31 are exposed to the pressures in the control chamber 28 and at the second port 20. As will be described, a greater pressure in the control chamber 28 than in the second port 20, tends to push the piston 31 farther into the main poppet 24 and compress the disk spring 34.

Movement of the main poppet 24 is controlled by an actuator, such as a solenoid actuator 38 that comprises an electromagnetic coil 39, an armature 42 and a rod-like pilot valve element 44. The armature 42 is positioned within the first bore 16 through the valve body 14 and is biased toward the main poppet 24 by a first, or modulating, spring 45 that exerts a force which can be varied by an adjusting screw 41 threaded into an exposed end of the first bore 16. The electromagnetic coil 39 is located around and secured to valve body 14. The armature 42 slides within the first bore 16 away from main poppet 24 in response to an electromagnetic field created by applying electric current to the electromagnetic coil 39.

The pilot valve element 44 is slideably received in a second bore 46 in the tubular armature 42. A second spring 48, that engages a snap ring 51 secured to the pilot valve element, biases the pilot valve element 44 outward from that second bore 46 so that in a de-energized state of the solenoid actuator 38, a proximate end with a conical tip 52 enters the pilot passage 36. The conical tip 52 engages the main poppet at a pilot seat 54 formed where the pilot passage 36 opens into the control chamber 28. A remote end 43 of the pilot valve element 44 is recessed within second bore 46 from the adjacent end of the armature 42 when the valve 10 is in the closed state as illustrated. That pilot valve element remote end 43 has an aperture within which a pull pin 47 is press-fitted. The pull pin 47 has an exterior head that engages a washer 49 that is held between the end of the armature 42 and the first spring 45. A gap is created between the washer 49 and the adjacent end of the pilot valve element 44 that allows the pilot valve element to slide upward within the armature 42 and the first spring 45 against the force of the second spring 48 at the other end of the pilot valve element. The first spring 45 has a significantly greater spring rate than the second spring 48 so that force applied to the tip of the pilot valve element 44 will produce that sliding action before the armature 42 compresses the first spring, as will be described.

In the de-energized state of the electromagnetic coil 39, the first spring 45 forces the armature 42 toward the main poppet 24, while the second spring 48 forces the pilot valve element 44 outward from the armature also toward the main poppet. This combined action results in the pilot valve element's conical tip 52 closing the pilot passage 36 and blocking fluid communication between the control chamber 28 and the second, or outlet, port 20. As a result, pressure is trapped within the control chamber 28, thereby resisting force that tends to move the main poppet 24 off the main valve seat 22 and open the hydraulic valve 10.

Energizing the solenoid actuator 38 enables proportional control the flow of hydraulic fluid between the first and second ports 18 and 20. Electric current applied to the electromagnetic coil 39 generates a magnetic field that draws the armature 42 upward into the solenoid actuator 38 which action tows the pull pin 47 and the pilot valve element 44 upward. This movement pulls the pilot valve element 44 away from the main poppet 24 thereby opening the pilot passage 36 to the control chamber 28. When the pilot passage opening reaches a predefined size, as determined by the static pressure areas of the main poppet, the main poppet follows the pilot valve element moving away from the valve seat 22. In the opened state, the main poppet 24 moves into a position at which the tip 52 of the pilot valve element enters and closes the pilot passage 36 in the main poppet. The magnitude of that electric current determines the distance that the pilot valve element 44 travels from the main poppet 24 and thus the distance that the main poppet is able to move away from the valve seat 22. Therefore, the electric current magnitude controls the degree to which the valve opens and correspondingly the amount of fluid flow through the valve 10.

Pressure at the first port 18 is communicated through the second control passage 27 to the control chamber 28 so that equal pressure levels exist at the first port and the control chamber. Pressure at the second port 20 is communicated through the first control passage 25 to the pilot chamber 33. Therefore the pressures at the two ports act on opposite sides of the pilot piston 31.

Pressure fluctuation at the ports 18 and 20 varies the pressure differential across the hydraulic valve 10 which can affect the magnitude of electrical current required to operate the valve as desired. In the present valve 10, the effect that the pressure differential has on the main poppet 24 is counterbalanced by movement of the pilot seat 54 in the pilot piston. The disk spring 34 enables the pilot seat 54 to move with respect to the main poppet 24 in response to changes in the pressure differential across that poppet. Such movement effectively alters the axial position of the pilot seat 54 to offset the effects of pressure differential changes on the pilot valve. This action compensates for the hydraulic imbalance on the pilot valve element 44 and the modulation spring force to actuator force balance.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:
1. A pilot operated hydraulic valve comprising:
   a body with a first port, a second port, and a valve seat between the first port and the second port;
   a main poppet selectively engaging the valve seat to control flow of fluid between the first port and the second port and defining a control chamber, wherein pressure in the control chamber controls movement of the main poppet, the main poppet having an aperture in fluid communication with the second port and the control chamber;

a pilot piston moveably received in the aperture of the main poppet and having a pilot passage there through;

a first disk spring biasing the pilot piston away from the main poppet;

pilot valve element which operates to open and close the pilot passage; and an actuator operably coupled to move the pilot valve element.

2. The pilot operated hydraulic valve as recited in claim 1 wherein the first disk spring biases the pilot piston into the control chamber.

3. The pilot operated hydraulic valve as recited in claim 1 wherein a second disk spring abuts the first disk spring to bias the pilot piston.

4. The pilot operated hydraulic valve as recited in claim 1 wherein the main poppet further comprises a control passage that provides a fluid path between the first port and the control chamber.

5. The pilot operated hydraulic valve as recited in claim 4 further comprising a fixed orifice in the control passage.

6. The pilot operated hydraulic valve as recited in claim 1 wherein the control chamber is fonned on a side of the main poppet remote from the valve seat.

7. The pilot operated hydraulic valve as recited in claim 1 wherein the actuator comprises:

an armature that moves within the body and having an bore therein within which the pilot valve element is slideably received;

a first spring biasing the armature with respect to the body; and a second spring biasing the pilot valve element with respect to the armature.

8. The pilot operated hydraulic valve as recited in claim 7 wherein the second spring has a lesser spring rate than the first spring.

9. The pilot operated hydraulic valve as recited in claim 7 wherein engagement of the pilot valve element with the pilot piston causes the second spring to yield and allow the pilot valve element to slide within the armature.

10. The pilot operated hydraulic valve as recited in claim 7 wherein the actuator further comprises an electromagnetic coil that produces an electromagnetic field which causes movement of the armature.

11. A pilot operated hydraulic valve comprising:

a body having a first bore therein into which a first port and a second port open, and having a valve seat in the first bore between the first port and the second port;

a main poppet within the first bore selectively engaging the valve seat to control flow of fluid between the first port and the second port and forming a control chamber on a side of the main poppet remote from the valve seat, the main poppet having an aperture that provides a fluid path between the first port and the control chamber;

a pilot piston, with a pilot passage there through, is received in the aperture of the main poppet, with the control chamber and a pilot chamber on an opposite sides of the pilot piston, wherein a pressure differential between the control chamber and the pilot chamber tends to produce movement of the pilot piston within the aperture;

a first disk spring biasing the pilot piston away from the main poppet;

pilot valve element which operates to open and close the pilot passage; and an actuator operably coupled to move the pilot valve element.

12. The pilot operated hydraulic valve as recited in claim 11 wherein a pilot valve seat is formed in the pilot piston at an opening of the pilot passage into the control chamber.

13. The pilot operated hydraulic valve as recited in claim 12 wherein forces from the first disk spring and the pressure differential between the control chamber and the pilot chamber alter a position of the pilot valve seat with respect to the main poppet.

14. The pilot operated hydraulic valve as recited in claim 11 wherein the first disk spring biases the pilot piston into the control chamber.

15. The pilot operated hydraulic valve as recited in claim 11 wherein a second disk spring abuts the first disk spring to bias the pilot piston.

16. The pilot operated hydraulic valve as recited in claim 11 wherein the main poppet further comprises a control passage that provides a fluid path between the first port and the control chamber.

17. The pilot operated hydraulic valve as recited in claim 11 wherein the actuator comprises:

an armature that moves within the body and having a second bore therein within which the pilot valve element is slideably received;

a first spring biasing the armature with respect to the body; and a second spring biasing the pilot valve element with respect to the armature.

18. The pilot operated hydraulic valve as recited in claim 17 wherein the second spring has a lesser spring rate than the first spring.

19. The pilot operated hydraulic valve as recited in claim 17 wherein engagement of the pilot valve element with the pilot piston causes the second spring to yield and allow the pilot valve element to slide within the armature.

20. The pilot operated hydraulic valve as recited in claim 17 wherein the actuator further comprises an electromagnetic coil that produces an electromagnetic field which causes movement of the armature.

* * * * *

UNITED STATES PATENT AND TRADEMARK OFFICE
CERTIFICATE OF CORRECTION

PATENT NO. : 7,341,236 B2 Page 1 of 1
APPLICATION NO. : 11/370003
DATED : March 11, 2008
INVENTOR(S) : Dwight B. Stephenson et al.

It is certified that error appears in the above-identified patent and that said Letters Patent is hereby corrected as shown below:

On the Title Page, Item (75)
Inventor name listed as "Jackson, Randall J. (Burlington, WI)" should be listed as "Jackson, Randall S. (Burlington, WI)".

Claim 6, Column 5, Line 25:
"fonned" should be
--formed--.

Signed and Sealed this

Tenth Day of February, 2009

JOHN DOLL
*Acting Director of the United States Patent and Trademark Office*